Oct. 2, 1934.  C. F. LINDERMAN  1,975,366
MOTOR VEHICLE CHASSIS
Filed May 11, 1932   3 Sheets-Sheet 1
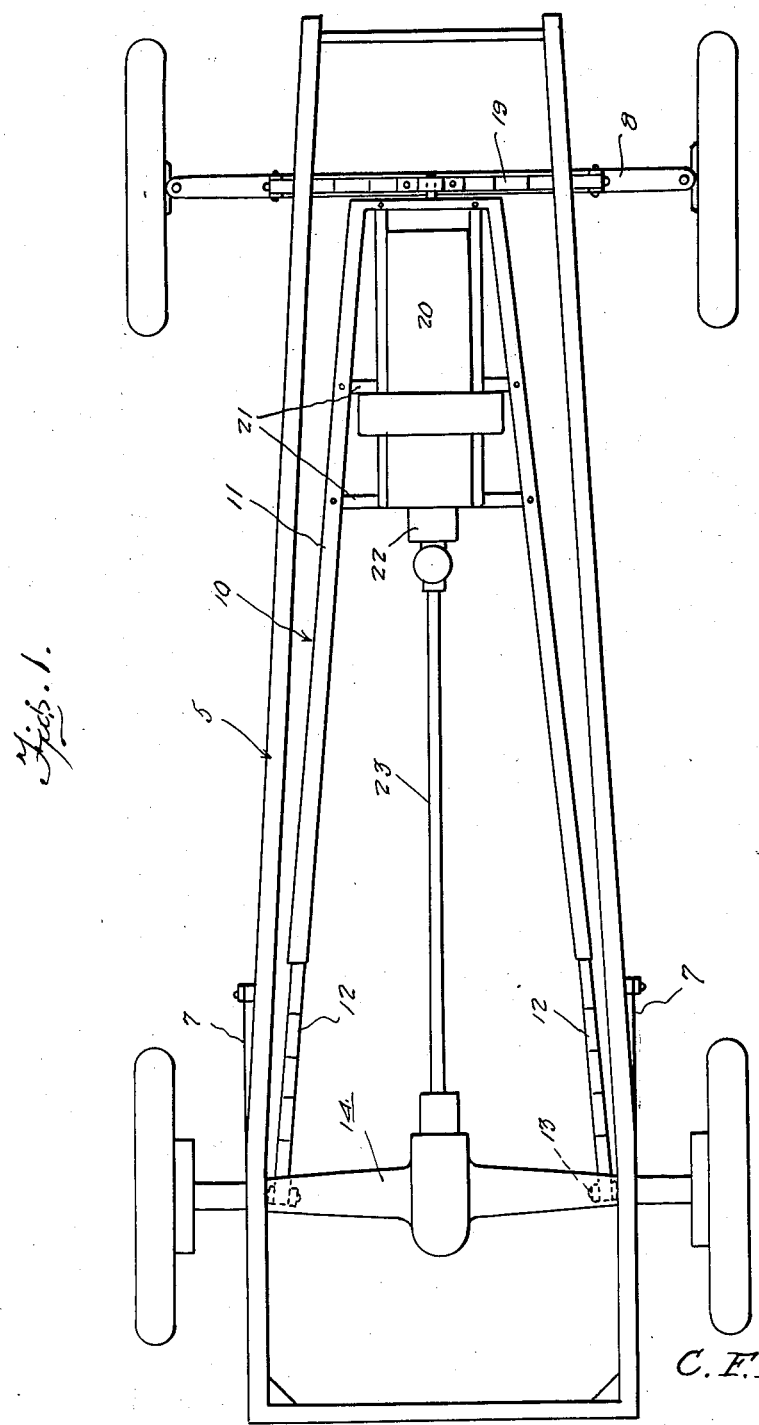

Oct. 2, 1934.　　C. F. LINDERMAN　　1,975,366
MOTOR VEHICLE CHASSIS
Filed May 11, 1932　　3 Sheets-Sheet 2
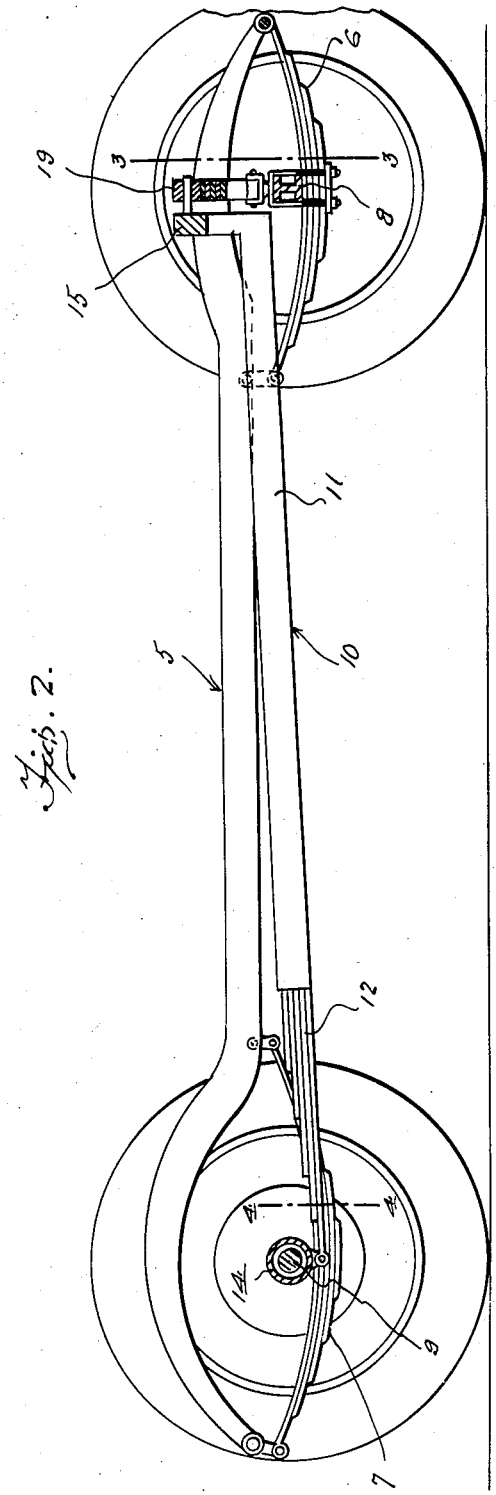
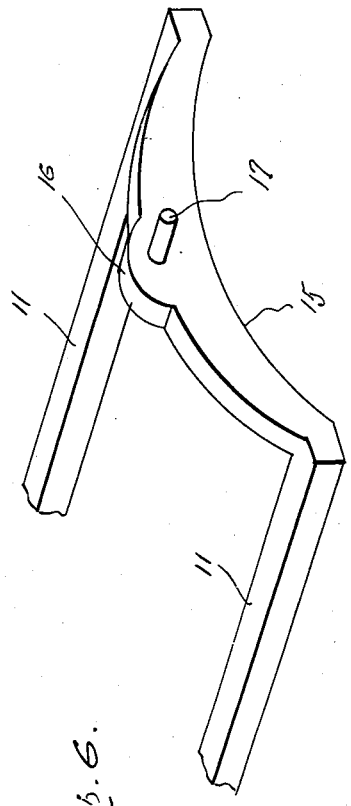
Inventor
C. F. Linderman
By Clarence A. O'Brien
Attorney Oct. 2, 1934.  C. F. LINDERMAN  1,975,366
MOTOR VEHICLE CHASSIS
Filed May 11, 1932  3 Sheets-Sheet 3

Inventor
C. F. Linderman
By Clarence A. O'Brien
Attorney

Patented Oct. 2, 1934

1,975,366

UNITED STATES PATENT OFFICE 1,975,366

MOTOR VEHICLE CHASSIS

Clarence F. Linderman, Brookville, Ind., assignor of one-fourth to William V. Baudendistel, Brookville, Ind.

Application May 11, 1932, Serial No. 610,650

4 Claims. (Cl. 180—58)

My invention relates to motor vehicle chassis improvements looking to the elimination of transmission of motor vibration and road shocks and the like to the body of the vehicle.

It is an important object of my invention to provide novel suspension means for the various units, including the body unit and the power unit, whereby the power unit is carried in such a relationship with respect to the body unit that the vibrations created by the motor are prevented from being transmitted directly to the body unit, the body unit including the usual chassis frame, and the power unit being suspended from and carried in a less rigidly connected manner than is the conventional practice.

It is also an important object of my invention to provide a motor vehicle chassis structure which is provided with auxiliary frame means for supporting the power unit and drive means in such a relationship with the chassis frame proper, that road shock and motor vibration are prevented from being transmitted directly to the chassis proper.

It is also an important object of my invention to provide a novel motor suspending adjunct for a motor vehicle chassis which is inexpensive to construct and install, and is readily susceptible of quantity production.

Other objects and advantages of my invention will be apparent from a reading of the following description and the drawings wherein for purposes of illustration I have shown a preferred embodiment of my invention.

In the drawings:—

Figure 1 is a general top plan view of the embodiment.

Figure 2 is a longitudinal vertical sectional view through Figure 1.

Figure 6 is a perspective view of the front end of the auxiliary frame.

Figure 3:
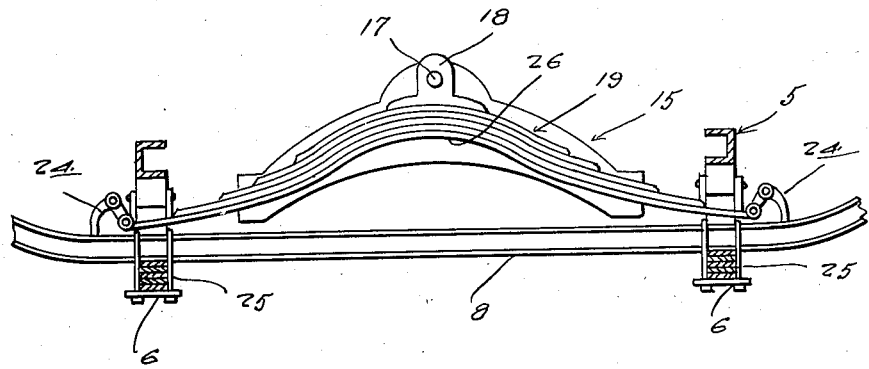
Figure 3 is a transverse vertical sectional view through the fore part of the embodiment in front of the front axle.
Figure 4:
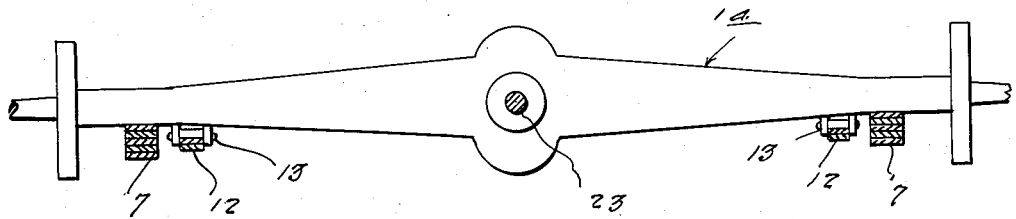
Figure 4 is a transverse vertical sectional view taken through Figure 1 just forward of the rear axle.
Figure 5:
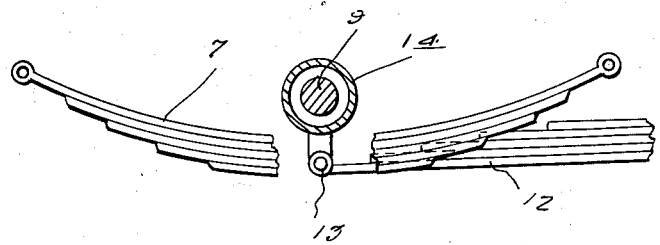
Figure 5 is a longitudinal vertical sectional view showing one of the rear springs partly broken away to expose the rear axle assembly.

Referring in detail to the drawings the numeral 5 generally designates a conventional chassis frame having the usual front springs 6 and the usual rear springs 7. The front axle 8 is supported by the springs 6 in an unusual manner, while the rear axle 9 is likewise supported by the rear springs 7, but in the case of the front axle, the springs 6 are placed thereunder instead of over the axle as is the usual construction. This is done in order to lower the frame with regard to the ground, which is the tendency of automobile design. Thus, with the exception of the noted disposition of the front springs with respect to the front axle, the chassis 5 may be conventionally formed.

The principle of the invention comprises the utilization of an auxiliary frame generally designated 10 which is flexibly suspended upon the front and rear axles within the chassis frame 5, which auxiliary frame carries the motor and its appurtenances so that the vibration and shock incident to the action of these parts of a motor vehicle are resiliently reduced in their transmission to the chassis frame 5, upon which the vehicle body is mounted. Because of the construction of the auxiliary frame 10 and its resilient suspension and the manner in which it is connected to the main chassis frame 5, motor vibration and road shock is practically eliminated as a phenomenon incident to motor vehicle operation.

The auxiliary frame 10 comprises side members 11 of suitable cross section and strength. These side members 11 are transversely spaced from each other and diverge toward one end which is the rear end of the frame, where they are provided with extensions 12 in the form of leaf or other type of springs which are connected either rigidly or pivotally as indicated at 13 to the underpart of the rear axle housing 14 inwardly of the conventional rear springs 7. The forward or converging ends of the side members 11 are connected by a suitably strong cross member 15 the formation of which is shown in detail in Figure 6. For clearance purposes the cross member 15 may be upwardly bowed transversely as indicated. Centrally of the upper edge of the cross member 15 there is provided a curvate block 16 in which is mounted the horizontal forwardly projecting pin 17 which is to be rotatably supported in an inverted T-shaped spring supported block 18 which is mounted upon an auxiliary transverse spring 19 to be described.

The motor 20 may be mounted in any suitable manner upon cross members 21 spaced from the front end of the auxiliary frame. The transmission 22 as well as the drive shaft 23 and its front connections will be in similar manner supported by the auxiliary frame.

For giving the front end of the auxiliary frame the proper resilient suspension and support I provide the transverse spring 19 already mentioned which is suspended in a well known manner upon spring perches 24 which are mounted upon the upper side of the front axle 8 outward of the underslung connection 25 of the conventional front springs 6, this arrangement being particularly well shown in Figures 2 and 3.

The transverse spring 19 is provided with a distinctly upwardly bowed central portion 26 for enabling the use of a longer spring and for providing advantages of added clearance and more resilient action, whereby the front end of the auxiliary frame is more flexibly supported. As indicated the block 18 is secured upon the upwardly bowed central portion 26 of the transverse spring and receives the pin 17 in such manner that the auxiliary frame may rock relative to the front transverse spring.

It will be obvious that the auxiliary frame may be modified in some respects to facilitate its installation in different types of chassis and to meet particular conditions, without the necessity of any alterations which go to the essence of the invention.

It will be observed that the forward and rear connections of the auxiliary frame are such as to prevent longitudinal movement of the auxiliary frame relative to the chassis, and that the same connections permit transverse rotation of the auxiliary frame in response to the torque and pulsations of the power unit including the motor, the transmission, and the drive shaft, this response of the auxiliary frame acting to neutralize such phenomena and others, whereby to prevent their transmission in harmful and disturbing form to the chassis frame and to the body mounted thereon.

It will be observed that the auxiliary frame 10 is shown mounted in a plane below the chassis frame 5, and this will be the usual provision, arrangement being made for proper road clearance and also for proper clearance between the auxiliary frame and the chassis frame and the body. Under certain conditions flexible connections of such elements as have a necessary operative relationship between the auxiliary frame and the chassis will be provided.

Though I have shown and described herein the preferred embodiment of my invention, it is to be definitely understood that I do not desire to limit the application of my invention thereto, and any change or changes may be made in material and in structure and arrangement of parts, within the spirit of the invention and the scope of the subjoined claims.

What is claimed is:—

1. In a motor vehicle including front and rear axles, a chassis frame and springs connecting the frame to the axles, an auxiliary frame including a front transverse bar, resilient means for connecting the end of the auxiliary frame to the rear axle, a front auxiliary spring having its ends movably connected with the end portions of the front axle and means for pivotally connecting said front transverse bar to the central portion of said spring.

2. In a motor vehicle including front and rear axles, a chassis frame and springs for connecting the frame to said axles, an auxiliary frame for supporting the power and transmission units, said auxiliary frame including a front transverse bar bowed upwardly, a pin extending forwardly from the central part of said bar, a leaf spring, perches extending upwardly from the end portions of the front axle, hangers connecting the ends of the last mentioned spring with said perches, a block seated on the top of the central portion of the last mentioned spring and having a hole therein for pivotally receiving the pin and spring means for connecting the rear end of the auxiliary frame to the rear axle.

3. In a motor vehicle including front and rear axles, a chassis frame and leaf springs connecting said frame to the axles, said springs passing under the axles and having their central portions connected therewith, an auxiliary frame for supporting the power and transmission units of the vehicle, leaf springs connected with the ends of the side members of the auxiliary frame and having their rear ends connected with the under side of the rear axle, said auxiliary frame including an upwardly bowed front transverse bar, a forwardly extending pin at the center of said bar, an upwardly bowed leaf spring having its ends movably connected with the end portions of the front axle and a block on the top of the last mentioned spring at the center thereof having a hole therein for pivotally receiving the pin.

4. In a motor vehicle having a front axle, a rear axle housing with a drive axle therein, a spring connected to the front axle, an engine frame connected to the spring and attached to the rear axle housing, an engine mounted in said frame having a drive connection to the drive axle, and a vehicle frame spring-mounted on the front axle, said spring mounting being independent of the engine frame, the forward end of the engine frame having a central pivotal connection to said spring.

CLARENCE F. LINDERMAN.